Patented Sept. 24, 1963

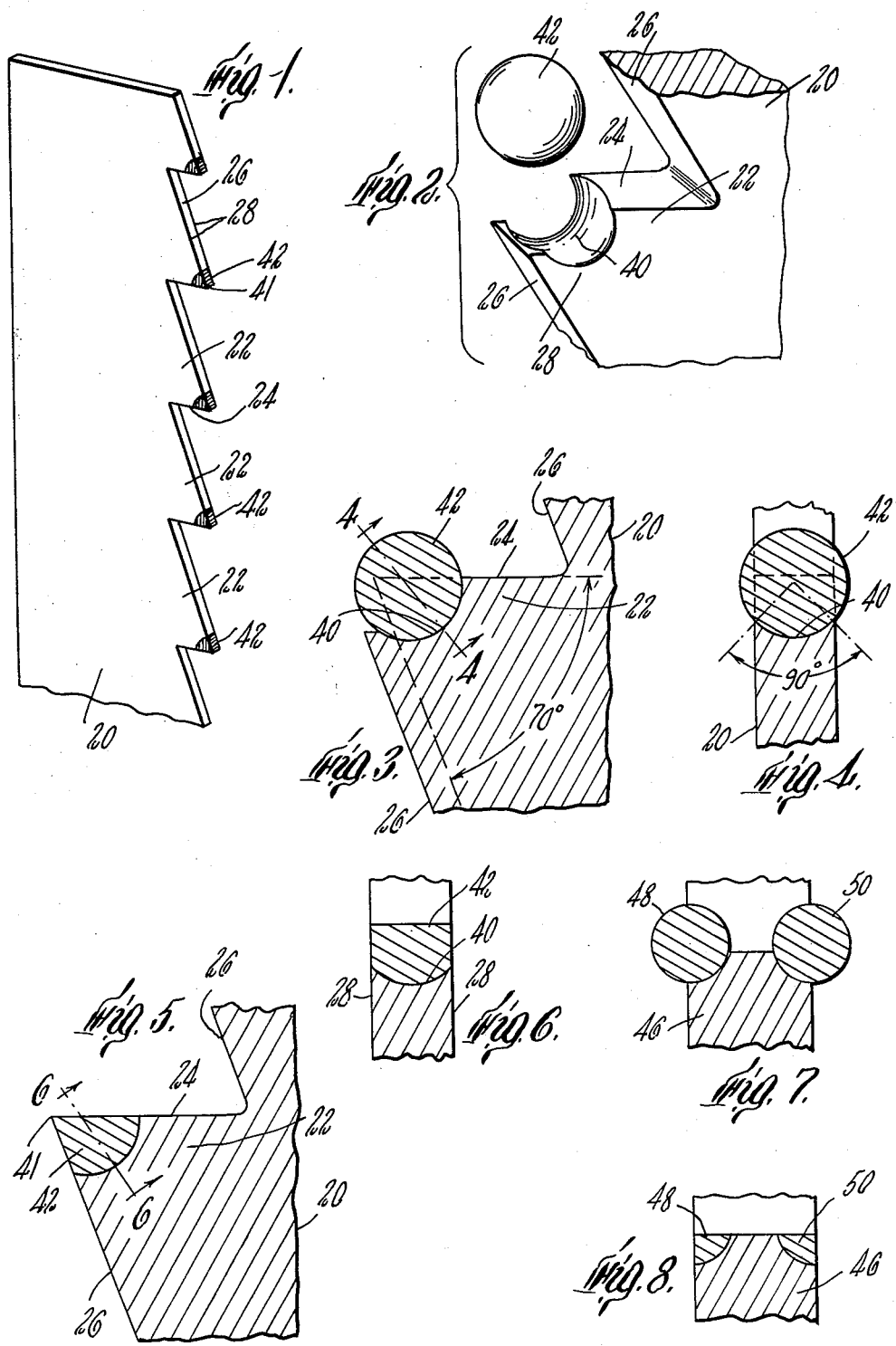

3,104,562
SAW
Victor A. Kolesh, Holden, Mass., assignor to Simonds Saw and Steel Company, Fitchburg, Mass., a corporation of Massachusetts
Filed June 29, 1961, Ser. No. 120,701
2 Claims. (Cl. 76—112)

The present invention relates to improvements in composite or tipped saws, or other cutting tools.

The invention is herein disclosed as embodied in a preferred form in a band saw having carbide tipped teeth. It will be understood, however, that the invention in its broader aspects is not limited to the particular form of saw employed, and that the invention is equally applicable to other types of saw blades including both straight and circular saws, as well as to other cutting tools.

It is a principal object of the invention to provide a composite saw of improved construction which is of simple construction and at the same time provides a reinforced tooth construction possessed of exceptional strength and durability.

It is a further object of the invention to provide a novel method of manufacture of a composite saw which provides for the assembling and welding of spherically shaped inserts of a hard material into the tip portions only of the teeth of a saw in a simple and unexpectedly effective manner.

With the above and other objects in view as may hereinafter appear, the applicant's improved method and the several features of the saw tooth assembly produced thereby will be readily understood by one skilled in the art from the following description taken in connection with the drawings in which:

FIG. 1 is a perspective view of a portion of a band saw having carbide tipped teeth in accordance with the invention;

FIG. 2 is a perspective view on an enlarged scale showing a saw tooth having a crater formed therein and with the spherical carbide insert in a separated position relatively thereto;

FIG. 3 is a sectional view taken on a center line of substantially the disclosure of FIG. 2 and further shown with the spherical carbide insert welded into position;

FIG. 4 is a sectional view taken on a line 4—4 of FIG. 3;

FIG. 5 is a view similar to FIG. 3, but showing the teeth subsequent to the operations of finishing the composite tooth;

FIG. 6 is a sectional view taken on a line 6—6 of FIG. 5;

FIG. 7 is a detail sectional view illustrating a modification of the invention in which spherical inserts are provided at each corner of the tip of a relatively wide tooth, this figure corresponding generally to FIG. 4 looking in the direction of the arrows 4—4 in FIG. 3; and FIG. 8 is a view similar to FIG. 7 but showing the tooth with its inserts subsequent to the operations of finishing.

In accordance with methods conventionally employed of incorporating inserts of a hardened material such as tungsten carbide in a cutting tool to provide a reinforced cutting edge, an insert which is usually rectangular in shape is normally employed. Such a rectangular insert must be first oriented and then fitted into a carefully preformed recess for subsequent cementing or welding into a single unit. Particularly in the case of construction such as a band saw having many relatively small teeth and correspondingly small cutting edges, such method has been found to be prohibitively expensive and not entirely satisfactory from the point of view of effective bonding of the hardened tips to the saw teeth.

Applicant has found that the problems inherent in the manufacture of heretofore known band saws may be solved in a novel manner, and at the same time provide a band saw or other tool of improved construction by the unique provision of a generally spherical surfaced insert with a crater like supporting means therefor. Such novel construction provides a spherical seating surface which is particularly adapted for withstanding the heavy shocks and strains set up along the cutting edge and in particular at the corner portions thereof, not only during use of the saw but also at the time the insert is being ground or otherwise finished to provide its cutting edges. Furthermore, when a material having a coefficient of expansion less than that of the steel saw supporting structure, such as tungsten carbide, is utilized as the hardened material, the cooling which follows the welding of the insert results in the establishment of compressive forces entirely around the insert seat, and hence the provision of a normally compressed insert within its seat. This substantially improved the strength of the composite structure, and is especially valuable in preventing dislodgment of insert in use.

Too, the use of a generally spherical insert or equivalent form having essentially point symmetry, together with a cooperating depression, is uniquely effective in eliminating alignment problems during manufacture, as is especially important in a structure such as a band saw having a multiplicity of relatively small inserts which must be welded to the supporting saw body.

Referring to the drawing, a band saw is provided which comprises a saw blade 20 which may be roughly .035 inch in thickness and 1.0 inch wide, having formed in one edge thereof a series of cutting teeth 22. As shown each tooth is triangular in shape and has a leading cutting face 24 normal to the line of travel of the blade, a trailing face 26, and side faces 28. The planes of the leading and trailing faces intersect to provide a transverse cutting tip edge with the side faces 28 defining the ends thereof.

The illustrated saw is of the general type having the tips of the individual teeth strengthened by the use of inserts of a harder material than that of which the saw blade is made, in order to increase the effectiveness and life of the saw. In the preferred construction shown the saw blade is made of steel, and the inserts, hereinafter more fully to be described, are made of a hardened or hardenable material such as one of the carbides, for example, tungsten carbide.

The invention is concerned more specifically with a novel method of providing carbide or other hardened or hardenable tips for the saw teeth or other cutting element, and with the improved composite saw or other tool produced in accordance with said method.

The inserts employed in the manufacture of a typical band saw in accordance with the invention are in the form of small spheres of tungsten carbide roughly 3/64 inch in diameter. To receive these inserts circular craters are provided in the leading edge face of each successive tooth. The shape of the craters into which successive carbide inserts are dropped is not critical for the reason that the subsequent welding operation causes any spaces left by an imperfectly shaped crater to be filled in thus forming a perfectly spherical seat and a tight bond between the spherical insert and the walls of said crater, especially by reason of the compressive forces established on the carbide insert upon cooling after welding.

However, for the most efficient results the crater will have a substantially circular surface outline and may be spherical or conical in shape so that a maximum support may be given to the insert. The crater may be produced in the leading edge face of each successive tooth by any of a number of well-known processes which would include punching, cold forming, milling, engraving and the like. As shown in the drawings, FIGS. 2, 3 and 4, a crater 40 is formed in the leding edge face 24 adjacent the transverse cutting tip 41. The circular crater 40 formed in the leading cutting edge face 24 is preferably as large as possible, with respect to the spherical area of the insert 42 received within it. As shown, this interface area is limited in the plane of the tooth to about 70 degrees, but in the transverse plane is preferably at least about 90 degrees.

The spherical insert 42 is then placed in the crater 40 and welded securely in place. The spherical or equivalent form of the insert has the advantage in assembly that no alignment of any sort is necessary, as it will even center itself accurately with the crater. In its assembled position the insert 42 extends outwardly on both sides of the tooth beyond side faces 28, forwardly of the leading face 24, upwardly of the trailing face 26, with the cutting edge within it. Next, the several faces of the tooth converging at the tip are finished off, as by grinding, including said leading face 24, the two side faces 28, and the trailing face 26 to form the finished tooth with its carbide tip as shown in FIGS. 5 and 6.

The spherically contoured bond thus formed between the insert 42 and the adjacent portions of the tooth 22 provides a maximum of support for the insert in the tooth to withstand shock and pressure from any direction, particularly because of the unique provision of compressive forces on the insert. The spherical seat has the further advantage that an insert of minimum size only is required to provide a carbide tipped tooth which is both strongly made and adapted for service over a long period of use.

FIGS. 7 and 8 illustrate a modification of the invention in which a wide tooth 46 has formed therein two carbide inserts 48, 50 one at each corner of the tooth tip. Said inserts 48, 50 are mounted in spherically formed seats, are welded into place and are then finished by grinding the several saw tooth faces including the leading edge face, the trailing face and the two side faces in the manner above described to provide a hardened insert at each cutting corner of the saw or other cutting tool.

This construction has the particular advantage that the greatest thickness of the carbide insert is concentrated at the corner of the cutting edge, at the precise point where the strains and wear on the metal are heaviest, while at the same time the support afforded by the spherically formed seat is similarly spaced to provide a substantially radial support against a strain in any direction.

The invention having been described what is claimed is:

1. The method of manufacturing a composite saw having a saw blade formed with a series of cutting teeth, each said tooth comprising a projection having a leading cutting face terminating in a transverse cutting tip edge, a trailing face, and side faces, which comprises the steps of forming a circular crater in said leading cutting edge face having the peripheral edge thereof extending beyond and encompassing at least one end of said cutting tip edge, positioning a spherical carbide insert in said crater, said spherical insert being of a diameter in excess of the diameter of the crater to overlie said end of the transverse cutting tip edge, welding said carbide insert positioned in said crater to said saw blade, and finishing said tooth including said insert which includes finishing said leading cutting edge face, said backed-off peripheral edge face, and said side faces.

2. The method as claimed in claim 1, further including forming said circular crater to intersect said trailing edge face and said side faces, and finishing said tooth to provide about a 70 degree interface between said insert and said tooth in the plane of said tooth and at least about a 90 degree interface in a plane transversely of said tooth.

References Cited in the file of this patent
UNITED STATES PATENTS 2,675,603    Goehle _____ Apr. 20, 1954
2,720,229    Drake _____ Oct. 11, 1955